United States Patent

[11] 3,588,251

| [72] | Inventor | Jacques Moret-Bailly<br>Dijon, France |
|---|---|---|
| [21] | Appl. No. | 663,104 |
| [22] | Filed | Aug. 24, 1967 |
| [45] | Patented | June 28, 1971 |
| [73] | Assignees | Centre National De La Recherche<br>Scientifique (C.H.R.S.)<br>Paris, France<br>Office National D'Etudes Et De Recherches<br>Aerospatiales (Onera)<br>Chatrillon-sous-Bagneux, France |
| [32] | Priority | Sept. 1, 1966 |
| [33] | | France |
| [31] | | 74,895 |

[54] SPECTROMETER INPUT OR OUTPUT DEVICES
12 Claims, 21 Drawing Figs.

[52] U.S. Cl. .................................................. 356/74, 356/257
[51] Int. Cl. ..................................................... G01j 3/00
[50] Field of Search ............................................ 356/74—98

[56] References Cited
UNITED STATES PATENTS

| 3,211,048 | 10/1965 | Girard | 356/80 |
| 3,343,446 | 9/1967 | Girard | 356/74 |
| 3,432,241 | 3/1969 | Girard | 356/96 |

*Primary Examiner*—Ronald L. Wibert
*Assistant Examiner*—V. P. McGraw
*Attorney*—Karl F. Ross ABSTRACT: Input and/or output gate for grid-type spectrometer with a multiplicity of substantially identically shaped, randomly distributed zones of a radiation transmissivity different from that of the background, the total area of the zones being preferably equal to that of the background outside the zones. The zones extend only over a small fraction of the overall grid surface in any dimension and, when the grid is to be used as a combined input and output gate in an autocollimating spectrometer, may be arranged in pairs symmetrically positioned with reference to a common center.

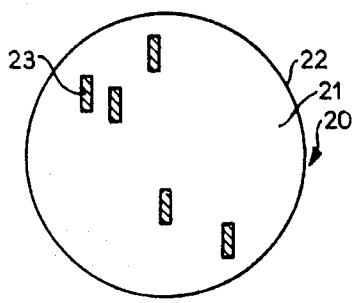
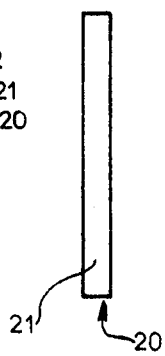
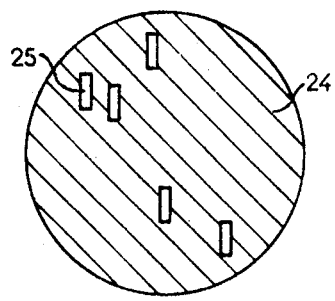
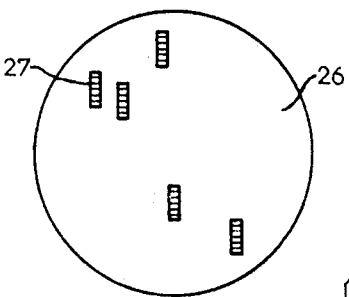
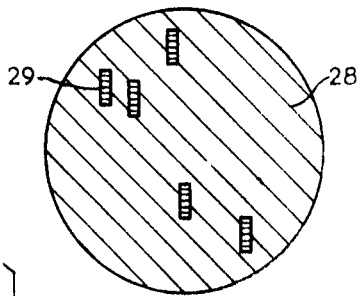
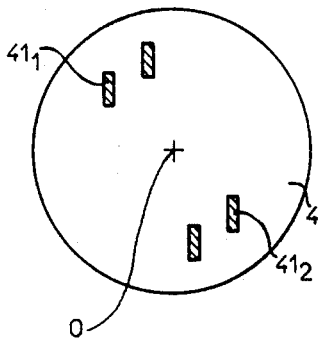
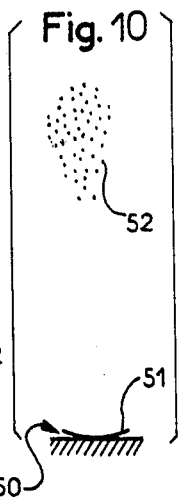
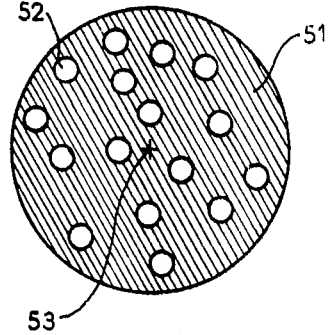
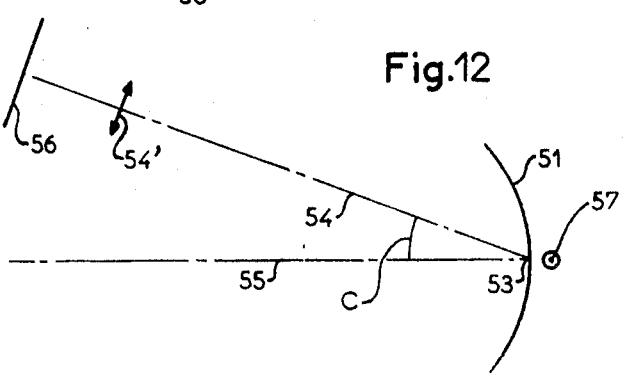

INVENTOR
Jacques MORET-BAILLY
by

PATENTED JUN28 1971 3,588,251

INVENTOR
Jacques MORET-BAILLY
by

INVENTOR
Jacques MORET-BAILLY 3,588,251

SPECTROMETER INPUT OR OUTPUT DEVICES

This invention relates to an improved input or output device for a spectrometer, specifically a so-called grid spectrometer as distinguished from earlier slit spectrometers. Such a grid spectrometer has been disclosed, for example, in commonly owned U.S. Pat. No. 3,211,048 to A. J. Girard;

Such spectrometers comprise, in lieu of the slits, input or output grid devices whose surface is considerably greater than the one of the slits, these devices being sometimes called, for this reason, surfacial radiation gates. On each of these devices are present zones of different radiation-conveying character, for instance transparent and opaque, or transparent and reflecting, or else reflecting and opaque/nonreflecting.

These spectrometers have, for the same resolving power, a considerably higher luminosity than the slit spectrometers.

It is an object of this invention to provide a surfacial input or output device for a spectrometer which enables to obtain a triangular spectrometric signal pulse identical or similar in shape to the signal pulse provided by a slit spectrometer (except that its amplitude is substantially greater than the one provided by the latter) and which, in particular, is free of the undulations or secondary peaks (sometimes termed "feet") displayed by spectrometric signals derived from some conventional grid-type spectrometers at the junctions of the steep flanks of the triangular pulse with the horizontal axis.

A more specific object is to provide a spectrometer in which this result is achieved without any reduction in the resolving power of the spectrometer.

A further object of the invention is to provide a spectrometer wherein the undulations or lobes of the mainly triangular signal are due exclusively to the dispersive portion of the spectrometer.

A further object of the invention is to provide a spectrometer whose spectrometric signal is entirely free from such undulations or lobes.

A related object of the invention is the provision of a spectrometer in which the elimination of the undulations or lobes of the signal can be obtained in accordance with a predetermined law.

A more specific object of the invention is to provide a spectrometer input or output device which will be usable in an autocollimation spectrometer.

It is also an object of the invention to provide a method and an apparatus for producing such an improved spectrometer input or output device.

Exemplary embodiments of the invention will now be disclosed with reference to the accompanying drawings wherein:

FIG. 1 is a highly schematic plan view of a device according to the invention;

FIG. 2 is a corresponding side view;

FIG. 3 is a view similar to FIG. 1, but for a modified embodiment;

FIG. 4 is a view similar to FIG. 1, but for a further embodiment;

FIG. 5 is a view similar to FIG. 1, but for still a further embodiment;

FIG. 9 is a view similar to FIG. 1 of a device designed for an autocollimation spectrometer;

FIG. 10 is a diagrammatic view illustrating one stage of the manufacture of a device according to the invention;

FIG. 11 shows schematically a product obtained during this stage;

FIG. 12 is a schematic plan view of a photographic setup usable in the process of producing a device according to the invention;

Figure 6:
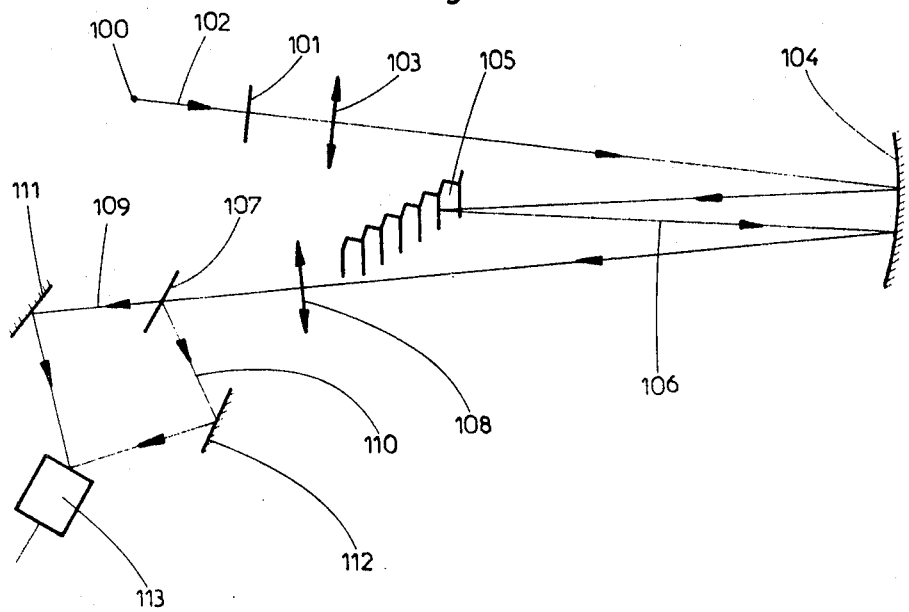
FIG. 6 is a diagrammatic view of a spectrometer to which the invention is applied.

FIGS. 1 and 2 represent highly schematically an input or output device according to the invention. Device 20 is made of a plate or block 21 of transparent material the useful contour 22 is advantageously of circular shape. Plate 21 is treated so that predetermined regions thereof are rendered opaque and, according to the invention, the opaque regions form a plurality of small areas 23 all of similar, elongated shape, extending in parallel relationship to one another, and randomly distributed or scattered. The devices according to this invention may differ materially from one another in the distribution of the areas therein, out for any one of such devices the distribution of the areas is at random.

In the embodiment of FIGS. 1—5 and 9, each area is, as shown to be rectangular. The areas are large in number and their dimensions are relatively small as compared to that of plate 21. The number of areas 23 is such that the total surface area of the plate 21 occupied by said areas will approximate 50 percent of the total surface area of the plate; however, the proportion is not critical, and may be about 40 percent for example.

In another embodiment (FIG. 3), the device of the invention comprises a plate or block having a nonreflecting opaque surface 24 with a multiplicity of transparent areas 25, shaped and distributed generally as indicated above with reference to FIGS. 1 and 2.

The radiation gate may also comprise a thin, strong opaque or reflective plate, e.g. of sheet metal, formed with cutouts constituting the areas 25.

In yet another embodiment (FIG. 4), the device comprises a transparent plate 26 formed with reflective areas 27.

In a further embodiment (FIG. 5), the device comprises an opaque nonreflective plate 28 provided with reflective areas 29.

Devices or grids of any of the types just described may be used as input and output gates of a spectrometer arranged, as known, so as to deliver a spectrometric signal.

The devices are so positioned that the small sides of the rectangular areas lie parallel to the direction of dispersion or spectrum spread.

It has been found that with a spectrometer so equipped there is obtained a spectrometric signal of substantially triangular shape free from undulations or lobes, this result being attained without the use of any special precautionary measures.

An explanation is as follows:

Consider two identical radiation gates or grids of the type disclosed above e.g. with reference to FIG. 3, i.e. plates having transparent rectangular areas on a black background. The length of the sides of the rectangles are $2x$ and $2y$. All the rectangular areas are similarly oriented and are randomly distributed. It is assumed for simplicity that one half of the total plate area is opaque and the other half thereof is transparent. With the two grids devices mutually juxtaposed, if a uniform flux $F$ of radiation is made to impinge on the grids, then:

i. If the two grids are in exact superposition, that is if the zones of one grid having a given character register with the zones of the other grid having the same character, then the radiation flux passing through the pair of grids is $F/2$;

ii. If one of the grids is displaced from its registry position with respect to the other to an amount $y$ in a direction parallel to the small sides of the rectangles, then the correlation between the patterns of the two grids drops to zero, and the radiation flux traversing the pair of grids is $F/4$.

Thus when one of the grids is displaced relatively to the other in the direction parallel to the small sides of the rectangles, the correlation at a maximum when the grids are in coincidence, drops sharply to zero for a relative displacement $y$, and then remains zero if the displacement is increased beyond that value.

If $n$ is the number of areas in each grid, with $n$ large enough, the probable relative error (or mean deviation) affecting the above indicated flux value is expressed by the ratio $0.34/\sqrt{n}$.

For instance, if it is desired that the relative error shall not exceed 1 percent, $n$ should be selected close to 1000.

When a spectrometer equipped with a pair of grids according to any of FIGS. 1—5 as input and output gates, said grids being so disposed that the small sides of the rectangles are parallel to the direction of spreading as determined by the dispersive system of the spectrometer, receives a monochromatic radiation and if the dispersive system is in the position corresponding to the wavelength of said radiation, the image of the input device is strictly in coincidence with the output device; all the radiation transmitted through the transmissive areas of the input device is likewise transmitted through the transmissive areas of the output device. If the dispersive system is displaced by a distance corresponding to a displacement of the image of the input device with respect to the output device equal to $y$, then only one-half of the radiation transmitted by the input device is transmitted by the output device, which corresponds to the null correlation considered above. Should the displacement increase, of half of the radiation conveyed by the input device continues to be conveyed by the output device.

The spectrometric signal provided by such a spectrometer may be triangular and substantially free from undulations or lobes.

In FIG. 6 there is shown a spectrometer assembly equipped with input and output devices comprising series of zones, e.g. as described in the above identified Girard patent. From a radiation source, shown at 100, the input device 101 receives a radiation beam 102 which after passage through a collimator 103 is directed by a mirror 104 onto a dispersive system 105, here shown as a grating, the dispersed beam 106 being reflected again by the mirror 104 onto the output device 107 after passage through a collimator 108. In this example, the transmitting zones of the input device 101 are transparent, and the output device 107 has series of first transparent zones which provide from beam 106 a first output beam 109 and a series of second, reflective zones which provide from beam 106 a second output beam 110. The two output beams 109 and 110 are reflected on mirrors 111 and 112 and directed towards a common receiver which may include for instance a transducer in the form of two at photoelectric cells and means represented 113 which constantly determine the difference between the electrical signals omitted by one and the other cell.

Figure 7:
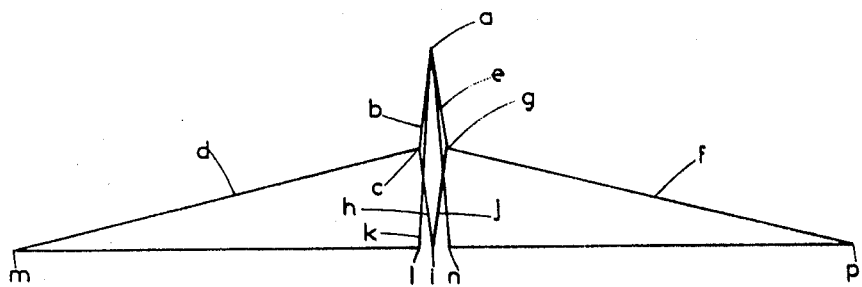
FIG. 7 is an idealized graph of the output of a grid spectrometer.

To a given position of the dispersive system 105, there corresponds a radiation wavelength which images the zones boundaries of the device 101 registering relationship with the zonal boundaries of the device 107; if the dispersive system is displaced from this position in one direction, the energy conveyed by the beam 109 on said wavelength is represented by the curve shown in FIG. 7 which, starting from an apex $a$ corresponding to the adjustment position of the dispersive system, comprises a steeply sloping section $b$, extending to a point $c$, followed by a section $d$ of relatively gentle slope which intersects the abscissa axis at $m$ for a position of the dispersive system in which the image of the input device is out of register with the output device. If the dispersive system is displaced in the opposite direction, starting from its initial adjustment position, the graph representing the energy conveyed by the beam 109 comprises sections symmetrical to those described with respect to the vertical line drawn through apex $a$, i.e. flanks $e$ and $f$.

Under similar conditions, the energy conveyed by beam 110 is represented in the first case by the straight line $h$, leading from point $i$ on the abscissa axis to the point $c$, and then by the straight line $d$; when the dispersive system is displaced in the other direction, sections are two straight lines $j$ and $f$.

The spectrometric signal is thus constituted, starting from apex $a$, by the straight line $k$ between point $a$ and point 1, having the same abscissa as point $c$, and then by the horizontal line segment $lm$; and for the opposite sense of displacement of the dispersive system, starting from the adjustment position, by the straight line $an$ and then the horizontal line $np$. The spectrometric signal, representing the difference between the photoelectric-cell outputs, is representable by the broken line $mlanp$ including the triangular portion $lan$, with the ordinate of apex $a$ representing the energy conveyed on the adjustment wavelength of the dispersive system.

Figure 8:
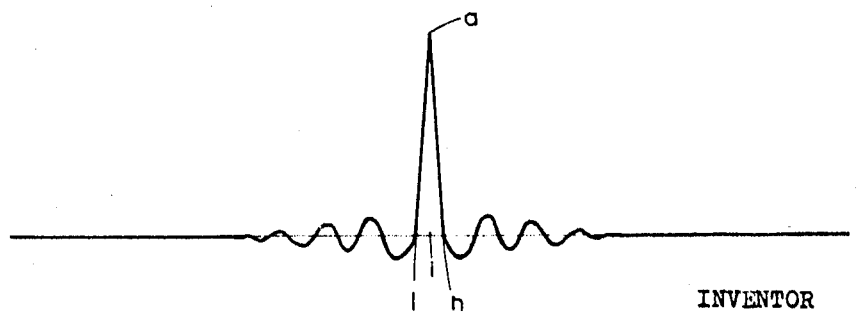
FIG. 8 is a similar graph of the actual output of a conventional grid spectrometer.

The graph just described is a theoretical one. When conventional surface-type input and output devices are used, the resulting signal is somewhat different from the one just disclosed; thus, the straight horizontal lines starting from points $l$ and $n$, and coinciding with the axis of the abscissae are replaced, on both sides intersections of the flanks $al$. and $an$ with the horizontal axis, by undulations or feet forming secondary peaks of progressively decreasing amplitudes as indicated in FIG. 8. With an input and output device according to the invention, on the other hand, the spectrometric signal delivered at the output of unit 113 is very close to the theoretical diagram, i.e. the undulations are practically suppressed.

According to a feature of the invention, it is contemplated to arrange the spectrometer in such a manner that by suitably choosing the longitudinal direction of the areas, the astigmatism of the spectrometer system is compensated for, the areas of the input device and the areas of the output device being astigmatically conjugated.

A grid having rectangular areas as disclosed makes it possible to compensate for diffraction in the direction normal to the spectrum-spread direction of the spectrometer. The correlation function corresponding to input and output devices according to the invention can be modified by choosing, for the areas of said devices, a shape differing from the rectangular one.

In one modification the areas, rather than being rectangular, have arcuate longitudinal sides to take into account the inherent distortion of the spectrometer.

In another modification, the areas have rounded ends.

In a further modified embodiment, the areas have rounded ends and slightly convex longitudinal sides.

According to a further feature of the invention, in order to vary the correlation function, additional correlations are introduced through a suitable distribution of the areas. Thus, if each area is paired with another area in displaced relationship with the first, the correlation function becomes the sum of two triangular functions.

A negative correlation can be obtained by providing the input and output grids with complementary rather than equivalent areas in respect to their radiation-transmitting characteristics, such as transparent areas in one device and opaque areas in the other.

The invention also allows for a single gate to serve as an input and output device, being thus usable in a spectrometer of the auto-collimation type. Such an embodiment is schematically shown in FIG. 9. There the areas, in addition to fulfilling the earlier-specified conditions in regard to number, shape and distribution, further satisfy additional conditions required for autocollimation operation, namely, on the one hand, that to any area $41_1$ of the device corresponds another area $41_2$ which, as a first approximation, is symmetrical with respect to a point 0 through which passes the optical axis of the apparatus (a departure from exact symmetry enabling possible corrections for spectrometer distortion) and, on the other hand, that the device should present two radiation-conveying characteristics.

For instance, the areas $41_1$, $41_2$ are transparent and the background 42 of the device is reflective, or conversely, the background 42 is transparent and the areas $41_1$, $41_2$ reflective.

Figure 21:
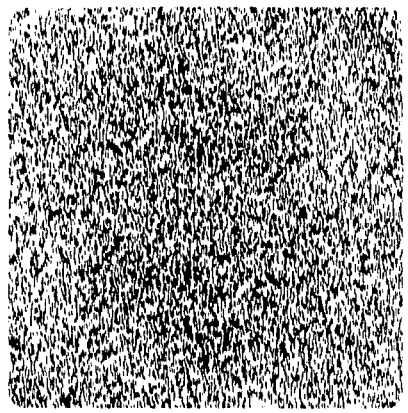
FIG. 21 is a true view of an input or output device according to the invention.

FIG. 21 is an actual view of such a device, as distinct from a schematic view.

A device of this type is advantageously usable in an apparatus wherein the spectrometric signal is obtained through vibrating the image of the input device relatively to the output device.

Let us consider once again two identical grids and assuming they are superposed; then, when one of the grids is displaced with respect to the other from its position of coincidence in a direction parallel to the large sides of the rectangular areas, having the length $2x$, the correlation factor which was unity for the position of coincidence drops sharply to zero as the displacement reaches the value $x$, and remains equal to zero for a larger displacement.

When the grids according to the invention are positioned in a spectrometer (autocollimating or other) subjected to vibration in a direction different from the direction of spectrum spread, this direction of vibration being parallel to the small or large sides of the rectangles, then the transmitted flux, equal to $F/2$ in the position of coincidence (in the simple case here considered where one-half of the surface area of each grid is transparent and the other half is reflective), assumes the value $F/4$ when the displacement due to the vibration exceeds the value $u$ or $x$, and retains this value for displacements exceeding $y$ or $x$. The flux varies periodically and a receiver will detect an alternating signal.

The invention further includes a method of manufacturing input and output gates for an autocollimation spectrometer, as will now be described, some of the teachings to be disclosed being also applicable to the manufacture of a device usable in a spectrometer other than the auotcollimation type.

According to FIG. 10, there is prepared an element 50 in the shape of a portion of a sphere, made from a suitable rigid material, has a concave face 51 which has just been coated with a suitable black paint not yet dry. On said element 50, placed on the floor with its concave face up, there is dropped a shower of small white circular discs 52, resembling confetti, a few millimeters in diameter, from a large height, as high as 10 meters. The white confetti 52 stick to the black surface of the part-spherical element with random distribution.

Figure 13:
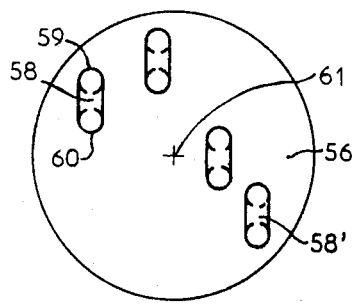
FIG. 13 is a highly schematic view of a photographic plate useful in the manufacture of the devices of the invention.

The resulting element, very schematically shown in FIG. 11, is then mounted in a photographic setup (FIG. 12) in front of a plate camera 56, in such a manner that its center 53 is on the axis 54 of the camera lens 54' with the axis 55 of the part-spherical element 50 slightly inclined with respect to the optical axis 54 by an angle $c$. This angle is determined in construction as a function of the distortion of the spectrometer in which the device is to be used. The speed of the photographic emulsion of the plate, the aperture of the lens and the illumination of the spherical element are so determined as to provide for a relatively long exposure time. During exposure of the photographic plate 56, the element 50 is displaced in a movement of translation at right angles to the plane defined by the axes 54 and 55 (which is the plane of the paper), the direction of this movement of translation being schematically shown by the circled dot 57. Latent images are then obtained on the photographic plate which are in the form of elongated areas 58 (FIG. 13) with rounded ends 59 and 60 which form part of the images of a generating disc 52, as projected at the start and the termination of the displacement of element 50.

The element 50 is then restored to its initial position. It is rotated by 180° about its axis 55, and a new exposure is conducted, as previously described, i.e. with translational displacement. There is obtained on the photographic plate 56 an array of latent images which are symmetrical with respect to the center 61 of the latent images previously obtained. Such a latent image is shown as being symmetrical with respect to the latent image 58 obtained in the first stage of the process.

Figure 14:
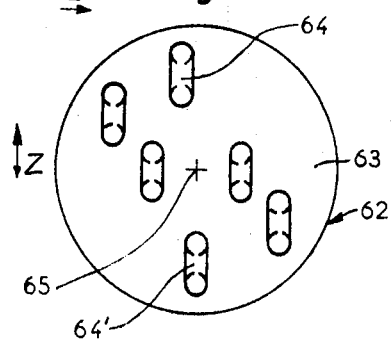
FIG. 14 is a highly schematic view of a photographic plate obtained in a subsequent state of manufacture.
Figure 15:
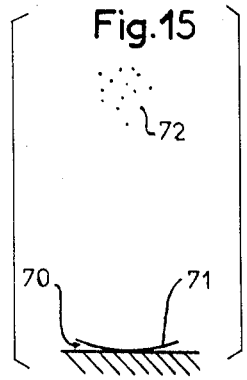
FIG. 15 is a schematic illustration of one stage of the manufacturing process, for a modification.
Figure 17:
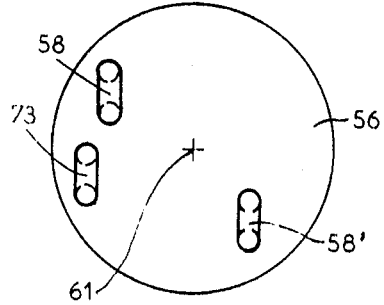
FIG. 17 is a schematic view of a photographic plate obtained during the manufacturing process.
Figure 16:
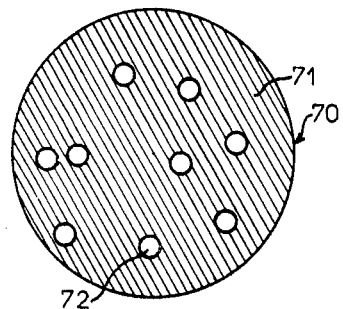
FIG. 16 is a schematic view of a product obtained.
Figure 18:
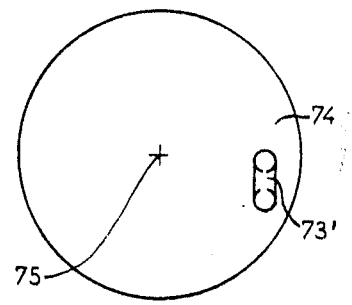
FIG. 18 is a highly schematic view of another photographic plate.
Figure 19:
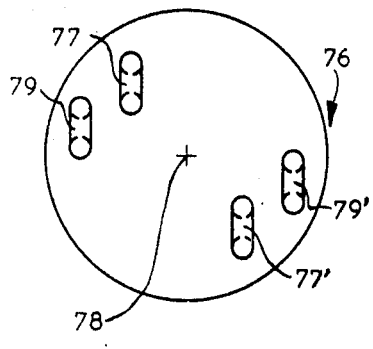
FIG. 19 is a highly schematic view of an input or output device produced according to the invention.

The plate 56 thus obtained is developed to obtain a high contrast. It can be used, after treatment, to provide complementary images by a photoengraving process, these images 62 having a transparent background 63 (FIG. 14) studded with reflective areas 64 and 64' symmetrically disposed with respect of center FIGS. 13 and 14, of course, show the traces of only a few discs of the array seen in FIG. 11; so produced may also have a reflective background with transparent symmetrical areas.

A specimen of this character may be used as a grid in an autocollimation spectrometer of the vibration type, wherein the direction of the vibration is normal to the direction of spreading. The grid is so positioned that the longitudinal direction of the areas is at right angles to the direct of spreading indicated by arrow $z$, and hence parallel to the direction of vibration indicated by double arrow $z$.

Reference is now made to FIGS. 15 to 19 which relate to a modified method of manufacture of a device according to the invention. With this modified method, there is first produced a photographic plate 56 (FIG. 13) having two multiplicities of latent images such as 58 and 58' symmetrical with respect to center 61. There is further prepared another part-spherical element 70 (FIG. 15) similar to element 51, freshly coated with black paint on its concave face 71, which is then showered with confettilike discs 72 over its concave surface, said discs being identical with those used in the first stage distributed in a random pattern of smaller density than that employed in said first stage.

The resulting element 70 (FIG. 16) is then placed in the same photographic setup as before described which includes the plate 56 previously exposed in the manner described with reference to FIG. 12. A further exposure is effected, with the element 71 being displaced by the same movement of translation as that which was earlier imparted to the element ,51. Latent images 73 (FIG. 17) are obtained, each of which has a contour of the same shape as that of the latent images 58, randomly distributed, but in smaller number than that of said latent images 58. Only a single latent image 73 is shown FIG. 17 for clarity.

The plate 56 is then removed from the photographic apparatus and an unexposed plate is mounted in its place. Element 70 is restored to its initial position. The element is rotated through by 180° about its axis and a new exposure is carried out while a translation movement, identical with the previous one, is imparted to element 70. A plate 74 (FIG. 18) is thus obtained, having latent images 73', symmetrical with respect to center 75 of plate 74, of the positions of latent images 73.

After development of plates 56 and 74, a positive of plate 56 and a negative of plate 74 are printed, and the positive and negative are superimposed. It is from this composite print that the specimen and photoengraving are produced. There is obtained a block or plate 76 (FIG. 19) which present areas 77 and 77', that are symmetrical with respect to the center 78 and have the same conveying character, and areas 79 and 79', which have the complementary conveying character.

Figure 20:
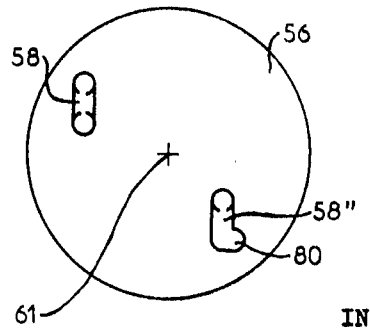
FIG. 20 is a similar view of a modified input or output device.

Reference is now made to FIG. 20 which relates to a modified embodiment. Starting with a photographic plate 56, latent images 58 are formed thereon with the part-spherical element 51 (FIG. 10 and 11) being displaced in translation along axis 57, similarly to what was disclosed with reference to FIG. 12. Element 51 is restored to its initial position. It is then rotated through 180° about its axis 55 and is thereafter displaced in a direction normal to that of axis 57 along a distance of the order of magnitude of the radius of a confettilike disc. A further exposure is made, during which element 51 is first moved back to its earlier position prior to displacement, by a shift at right angles to axis 57, and is then translated in parallel relationship to axis 57, so as to restore it to its initial position. There is obtained in this way a latent image 58'' that is generally symmetrical to area 58, with respect to the center 61 of plate 56, but exhibits shows an extension or spur 80 at one end. This slight difference in configuration between mutually symmetrical areas has in some cases been found to yield improved results with regard to the elimination of the undulations or lobes, that is, the obtention of a spectrometric signal free from undulations at the junctions between its steep sloping sides and the axis of the abscissae.

It will thus be seen that I have provided a radiation gate wherein the support 21, 26 etc. has a coherent surface with the zones 23, 27 etc. randomly distributed thereacross, each of these zones $F/4$ only over a small fraction of the overall grid surface in any direction. When the image of the input gate is projected upon the output gate with any wavelength other than the one selected by the setting of the dispersive system, the probability of the image of any transmissive input-grid zone coinciding with a transmissive output-grid zone is 50 percent if the total area of the zones equal half the area of the remainder of the surface. This fact, together with the elimination of half the original flux at the input, accounts for the aforementioned magnitude of F/4 of the outgoing flux in any position other than the adjustment position of the system.

I claim:

1. A device serving as a radiation gate in a spectrometer, comprising a flat support with a coherent surface having a multiplicity of substantially identically shaped zones randomly distributed thereacross, the total area of said zones being of the same order of magnitude as the area of the remainder of said coherent surface, said remainder forming a background of uniform transmission characteristic for incident radiation, said zones being of different transmission characteristic for such radiation.

2. A device as defined in claim 1 wherein said zones extend only over a small fraction of said surface in any direction.

3. A device as defined in claim 2 wherein said zones are elongate with their major dimensions parallel to a given direction.

4. A device as defined in claim 2 wherein said zones are disposed in pairs substantially symmetrically positioned with reference to a common center.

5. A device as defined in claim 4 wherein said zones are elongate with their major dimensions parallel to a given direction, one zone of each pair having a spur transverse to said given direction.

6. A device as defined in claim 1 wherein said total area substantially equals 50 percent of the overall area of said surface.

7. In a spectrometer, in combination, input and output gating means for incident radiation comprising at least one device as defined in claim 1, dispersive means in the path of said radiation between said input and output gating means for spreading the spectrum thereof in a predetermined direction, said gating means and said dispersive means being relatively shiftable for projecting an image of said input gating means upon said output gating means with different wavelengths, and radiation-responsive transducer means positioned beyond said output gating means for generating a signal representative of transmitted radiant energy of a wavelength corresponding to a selected relative position of said gating means and said dispersive means.

8. The combination defined in claim 7 wherein said zones are elongate with a major dimension transverse to the spectrum-spread direction of said dispersive means.

9. The combination defined in claim 7 wherein said device is common to said input and output gating means, said zones forming a pattern divided into two halves substantially symmetrical about the center of said surface.

10. The combination defined in claim 7 wherein said zones extend only over a small fraction of said surface in any direction.

11. The combination defined in claim 7 wherein said total area substantially equals 50 percent of the overall area of said surface.

12. The combination defined in claim 7 wherein said surface has the same width in two mutually orthogonal directions.